United States Patent [19]

Kuznetsova et al.

[11] Patent Number: 4,491,751

[45] Date of Patent: Jan. 1, 1985

[54] SINGLE-PHASE STEP MOTOR

[75] Inventors: Olga M. Kuznetsova; Zoya D. Novakovskaya; Vladimir A. Denisov; Elena F. Kulevskaya; Jury S. Zhiltsov; Vyacheslav I. Kozlov; Vyacheslav K. Korol; Vladimir V. Kuzmin; Nikolai I. Pershin; Evgeny V. Vlasov, all of Moscow; Natalya M. Reshetnikova, Moskovskaya; Boris E. Tsirlin, Moscow, all of U.S.S.R.

[73] Assignee: Moskovsky Energetichesky Institut, Moscow, U.S.S.R.

[21] Appl. No.: 578,601

[22] Filed: Feb. 10, 1984

Related U.S. Application Data

[63] Continuation of Ser. No. 363,486, Mar. 30, 1982, abandoned.

[51] Int. Cl.³ .............................................. H02K 37/00
[52] U.S. Cl. .......................... 310/49 R; 310/40 MM; 310/156; 368/160
[58] Field of Search ............... 310/49 R, 46, 162, 163, 310/164, 190, 191, 193, 156, 152, 154, 40 MM; 368/155, 157, 160

[56] References Cited

U.S. PATENT DOCUMENTS

| 3,433,987 | 3/1969 | Thees | 310/156 |
|---|---|---|---|
| 3,818,690 | 6/1974 | Schwarzwald | 310/49 R |
| 3,969,642 | 7/1976 | Yoshino | 310/49 R |
| 3,978,651 | 9/1976 | Yoshino | 310/40 MM |
| 4,041,336 | 8/1977 | Sudler | 310/49 R |
| 4,141,210 | 2/1979 | Flaig | 310/164 |
| 4,205,244 | 5/1980 | Fukushima | 310/40 MM |
| 4,260,915 | 4/1981 | Kawasumi | 310/156 |
| 4,262,353 | 4/1981 | Okazaki | 310/162 |
| 4,277,704 | 7/1981 | Giger | 310/162 |

FOREIGN PATENT DOCUMENTS

| 2559635 | 4/1977 | Fed. Rep. of Germany | 310/49 R |
|---|---|---|---|
| 2838709 | 12/1980 | Fed. Rep. of Germany | 310/156 |
| 1459981 | 8/1974 | United Kingdom | 310/49 R |

Primary Examiner—R. Skudy
Attorney, Agent, or Firm—Burgess, Ryan & Wayne

[57] ABSTRACT

A single-phase step motor comprises a stator having a coil and a magnetic circuit composed of a core and a plate having a hole in which is disposed a rotor equipped with a permanent magnet. The plate has a slot in the area of the hole, whose width and the position of the axis line thereof are determined by the magnetic asymmetry of the stator poles, sufficient to produce required driving and positioning torques of the motor.

1 Claim, 57 Drawing Figures

SINGLE-PHASE STEP MOTOR

This application is a continuation of application Ser. No. 363,486, filed Mar. 30, 1982, now abandoned.

FIELD OF THE INVENTION

This invention relates to electric motors and, in particular, to single-phase step motors and can be used in timepieces and automation devices.

Such motors are to display maximum efficiency with minimum dimensions, be inexpensive and highly reliable. These requirements are satisfied by single-phase moving-coil step motors whose rotor comprises a permanent magnet of high specific energy. They are operated from a separate source of heteropolar and unipolar pulses, depending on the type of design. High reliability and low cost of the motor can only be combined when the motor has a minimum number of parts which are easy to manufacture from the technological point of view.

PRIOR ART

Known in the art are single-phase step motors comprising a stator with a magnetic circuit and a coil, and a rotor featuring a radially magnetized permanent magnet. Pulse triggering of the coil produces in the working clearance between the stator and rotor a pulsating field which is superimposed upon the field of the rotor permanent magnet. With sufficient magnetic asymmetry of the stator poles a unidirectional rotation of the rotor can be produced. With no current in the coil the rotor is positioned in a specific position with relation to the magnetic circuit of the stator. Magnitudes of the driving and positioning torque of the motor are dependent upon the nature and degree of magnetic asymmetry of the magnetic circuit of the stator.

Most of the known step motors vary in execution of elements which provide the required magnetic asymmetry of the magnetic circuit of the stator. Electronic timepieces are often equipped with motors whose stator has a magnetic circuit comprising two pole shoes featuring cylindrical recesses (cf., for example, U.S. Pat. No. 3,969,642 Cl.310-49R, 1976, and U.S. Pat. No. 3,978,651 Cl.58-23, 1976). Magnetic asymmetry of the stator magnetic circuit is produced by mutual displacement of the pole shoes securing irregularity of the working clearance between the stator and rotor.

Such motors demand precise and expensive adjustment equipment in order to obtain a strictly specific arrangement of pole shoes having definite displacement. The assembly process is complicated and makes such single-phase step motors expensive.

This drawback is avoided in motors wherein the magnetic circuit of the stator comprises a plate with an orifice which forms poles and connecting straps. Magnetic asymmetry of the stator magnetic circuit is achieved by means of elements which can either be a separate element and disposed on the plate or nearby, or be an integral part of the plate itself.

In the known single-phase step motor (FRG Pat. No. 2,559,635 Cl.IPC H02K 37/00, 1977) magnetic asymmetry is produced by means of a cover plate made of a soft magnetic material, which has a hole for the rotor. The circumference of the hole in the cover plate features teeth projecting into the working clearance between the stator and rotor.

However, the cover plate cannot be set precisely on the stator plate because no elements are provided therefor. Characteristics of the motor cannot, consequently, be stabilized and the overall design of the motor cannot be considered a satisfactory technical arrangement.

In another known single-phase step motor (FRG Pat. No. 2,838,709 Cl. G 04C 3/00, 1980) magnetic asymmetry is achieved by setting permanent magnets on plate straps, the axis of magnetization of these magnets being coaxial with the line extending through the middles of the straps. The use of one permanent magnet placed on a strap or nearby results in radial magnetic attraction of the rotor magnet towards the stator magnet, whereas the use of two permanent magnets on two straps, though it reduces said radial attraction, requires strict equality of magnet characteristics, which is hard to realize. The radial magnetic attraction of the rotor magnets to the stator magnets in such motors affects their efficiency because of greater friction in the rotor shaft bearing.

The stator plate with a hole of a known single-phase step motor (U.S. Pat. No. 4,041,336 Cl. 310-49, 1977) is provided with four cylindrical projections arranged at a suitable distance from the edge of the plate opening to furnish adequate magnetic asymmetry of the stator magnetic circuit.

However, the cylindrical projections being disposed at a distance from the edge of the opening, the axial dimensions of the rotor magnet become larger to a magnitude close to the height of these projections. Consequently the rotor magnet becomes bulkier, and the magnet is used ineffectively.

The closest prototype of the proposed invention is a single-phase step motor (UK Pat. No. 1,459,981 Cl. H2A, 1978) comprising a stator with a coil and a magnetic circuit having a core and a plate with an opening forming poles and straps connecting said poles, and a rotor featuring a radially magnetized permanent magnet disposed in the opening of the plate. Magnetic asymmetry of the magnetic circuit of the stator is produced by a specific shape of the opening in the stator plate, wherein the rotor is located, which ensures a required irregularity of the working clearance between the stator and rotor.

However, many of the proposed embodiments of the shape of the opening in the stator plate are in practical terms hard to realize. Technologically effective are openings produced by shallow notches on the stator poles. This known motor demands high precision of treatment of the plate. Even slight deviations in configuration of the opening can have a profound effect upon the motor parameters. Notches in the stator poles are liable to be clogged up by dust, which also affects the performance of such a single-phase step motor and the reliability thereof. Moreover, interpole straps reduce the working magnetic flux through tapping of a part of the flux into straps. The known motor straps are as thick as the plate and the flux therethrough is substantial, varying from 20% to 30% of the total flux of the rotor magnet.

BRIEF DESCRIPTION OF THE INVENTION

It is an object of this invention to provide a single-phase step motor of high reliability and efficiency.

Another object of this invention is to provide a single-phase step motor of a versatile design readily applicable in watch industry and in automatic instrument production.

The invention essentially resides in that in a single-phase step motor comprising a stator with a coil and a magnetic circuit having a core and a plate with an opening forming the poles of the stator, and connected by straps and a rotor featuring a radially magnetized permanent magnet, placed in a hole in the plate, according to the invention, the plate has, at least on one side perpendicular to the rotor axis, at least one slot whose surface crosses the surface of the hole of the plate, the axis line of the slot is arranged in the area of the hole of the plate at an angle $\alpha$ to a line extending through the middles of straps connecting the poles of the stator, and, in order to provide a suitable magnetic asymmetry of stator poles, sufficient to produce specific driving and positioning torques of the motor, the angle $\alpha$ is ranged from 0° to 90°, the width of the slot is not to exceed three diameters of the rotor, and the depth of the slot is not to exceed ninety-five hundredths of the plate thickness.

It is advisable that the slot be made in a ledge of the plate, which is arranged in the direction of the axis of the rotor at least on one side of said plate in the area adjacent to the hole.

It is possible that the ledge of the plate, which is arranged in the direction of the rotor axis and has a slot, is formed by at least two arms of the plate, extending in the plane perpendicular to the rotor axis and bent to an angle of 180° and retained against the plate.

It is advisable that at least one ledge is provided inside the slot in the area adjacent to the hole of the plate, which extends in the direction of the rotor axis.

It is also wise that straps of the plate are provided with at least one slot reducing the cross-section of said straps.

It is advantageous that the surface of the slot of the plate is formed by at least two intersecting planes.

It is also advantageous that the surface of the slot has a form of a body of revolution.

It is expedient that the surface of the slot of the plate is formed by intersecting the surfaces of the bodies of revolution by planes.

It is quite possible that the slot is formed by walls of a pair of cover plates arranged at least on one side of the plate, said walls facing the rotor.

It is acceptable that the magnetic circuit is equipped with at least one more plate having a hole with cover plates arranged between the two plates of the magnetic circuit.

It is highly advantageous that on the other side of the plate there is provided a pair of cover plates whose walls facing the rotor form a slot whose axis line lies on one plane with the axis line of the slot located on the opposite side thereof.

It is possible that the cover plates are made of a soft magnetic material.

It is quite possible that the cover plates are made of a hard magnetic material and magnetized in a direction perpendicular to the line extending through the middles of the straps connecting the poles of the stator.

It is advisable that in at least one slot of the plate there is arranged at least one permanent magnet shaped like a prism and magnetized in a direction perpendicular to the line extending through the middles of the straps connecting the stator poles.

It is quite possible that in the area of connection of the plate and the core there is provided at least one permanent magnet magnetized in a direction parallel to the axis of the rotor.

It is convenient that a single-phase step motor comprises a swivelling cover plate having slits, the central slit enveloping at least a part of the hole of the plate forming a slot, whereas two other slits are guideways for the swivelling cover plate to rotate clockwise and counterclockwise and to regulate the magnitude and direction of the motor torque.

The present invention provides a simple and technologically effective design of a single-phase step motor. The service life of such a single-phase step motor becomes longer due to higher reliability and efficiency. This design can be a basis for other embodiments of a single-phase step motor whose potentialities are thus expanded as are the applications thereof.

BRIEF DESCRIPTION OF DRAWINGS

The invention will now be described in greater detail with reference to a specific embodiment thereof, taken in conjunction with the accompanying drawings, wherein:

FIGS. 6a, b, c, d, e, f illustrate a plate featuring slots of different shapes, according to the invention;

DETAILED DESCRIPTION OF THE INVENTION

A single-phase step motor comprises a stator having a coil 1 (FIG. 1) and a magnetic circuit having a core 2 and a plate 3 with a hole 4, which form poles of the stator, connected by straps 5 and 6, and a rotor 7 having an axis 8 and featuring a radially magnetized permanent magnet disposed in the hole 4 of the plate 3. At least one slot 9 is made in the plate 3 at least on one side thereof perpendicular to an axis 8 of the rotor 7. The surface of the slot 9 crosses the surface of the hole 4 of the plate 3. An axis line 10 of the slot 9 in the area of the hole 4 is arranged at an angle $\alpha$ to a line 11 extending through the middles of the straps 5 and 6 connecting the poles.

Figures 1, 2:
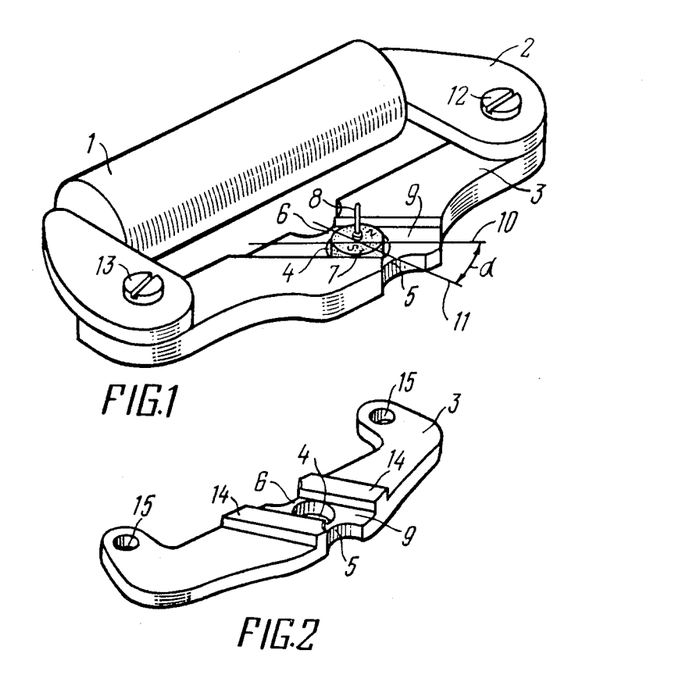
FIG. 1 illustrates an isometric general view of a single-phase step motor, according to the invention.
FIG. 2 illustrates a plate having a hole and a slot in the ledge, according to the invention.

In order to provide a suitable magnetic asymmetry of the stator poles, which is sufficient to produce specific driving positioning torques of a single-phase step motor, the angle $\alpha$ is selected from a range of $0<\alpha<90°$, the width of the slot 9 is taken not to exceed three diameters of the rotor 7, and the depth of the slot 9 is taken not to exceed ninety-five hundredths of the thickness of the plate 3.

The core 2 of the coil 1 is secured to the plate 3 by means of screws 12 and 13.

A ledge 14 (FIG. 2) featuring a slot 9 is made on one side of the plate 3 along the axis 8 of the rotor 7 in the area adjacent to the hole 4.

Figure 3:
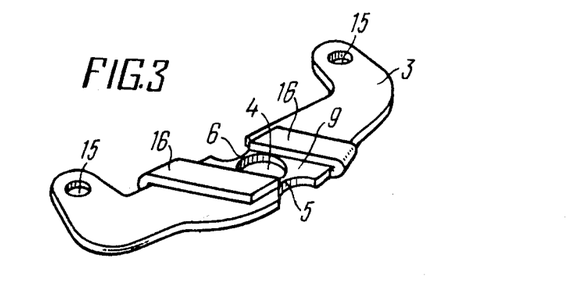
FIG. 3 illustrates a plate having a ledge formed by at least two arms, according to the invention.
Figure 4:
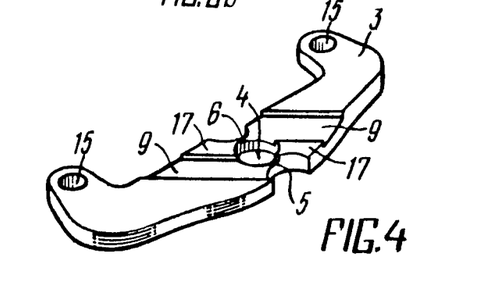
FIG. 4 illustrates a plate having a hole and a slot wherein ledges are made, according to the invention.

The plate 3 is provided with fastening holes 15. The ledge 14 located on the plate 3 in the area adjacent to the hole 4 can be made of arms 16 (FIG. 3) bent to 180° and made as one piece with the plate 3 in a plane perpendicular to the axis 8 (FIG. 1) of the rotor 7. Ledges 17 (FIG. 4) are provided inside the slot 9 in the area adjacent to the hole 4 of the plate 3 in the direction of the axis 8 (FIG. 1) of the rotor 7.

Figure 5A:
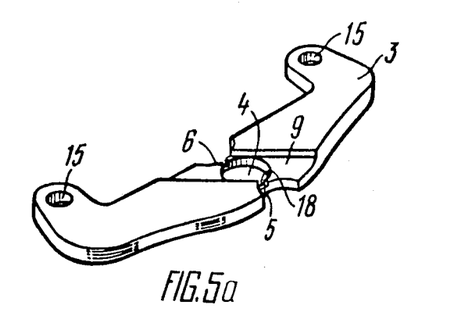
FIGS. 5a, b illustrate a plate having a hole and a slot, and an additional slot extending throught staps, according to the invention.
Figure 5B:
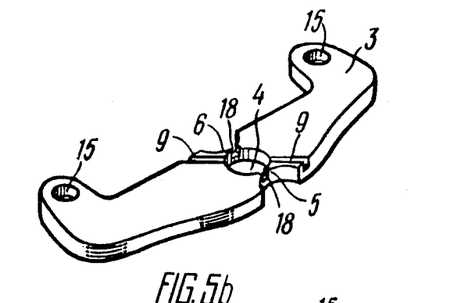

A slot 18 is made in the straps 5 and 6 (FIGS. 5a, b) of the plate 3 in order to reduce the cross-section of said straps 5 and 6.

Figures 6A, 6B, 6C, 6D, 6E, 6F:
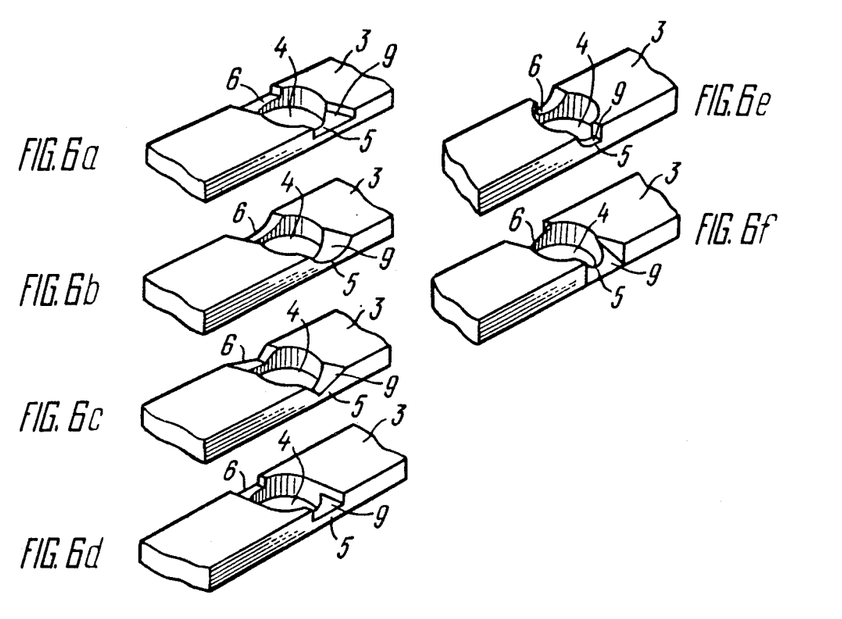

Referring to FIGS. 6a, b, c, d, e, f, the plate 3 has slot 9 of various shapes:

in FIG. 6c the surface of the slot 9 is formed by two intersecting planes, in FIG. 6a the slot is formed by three planes, two of these are parallel, in FIG. 6b the surface of the slot 9 is formed by a body of revolution, whose axis is parallel to the axis line 10 (FIG. 1) of the slot 9, in FIGS. 6d, 6f the slot is formed by six and four intersecting planes, respectively, in FIG. 6e the slot is formed by intersection of two surfaces with two cylindrical planes.

Figure 7A:
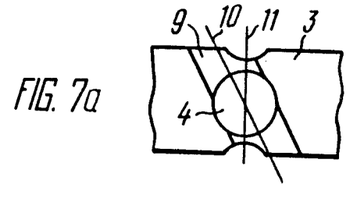
FIGS. 7a, b, c, d, e, f, k, l illustrate a plate featuring slots with different outlines, a view from above of FIG. 5, according to the invention.
Figure 7B:
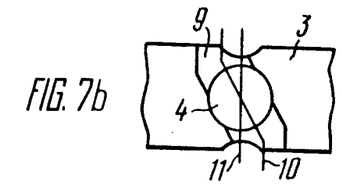
Figure 7C:
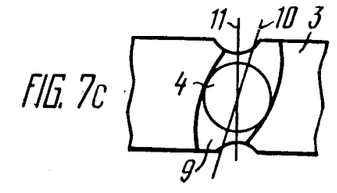
Figure 7D:
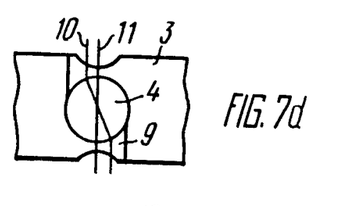
Figure 7E:
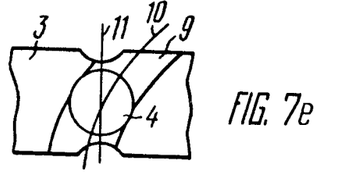
Figure 7F:
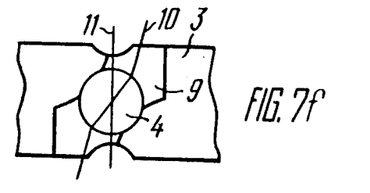
Figure 7K:
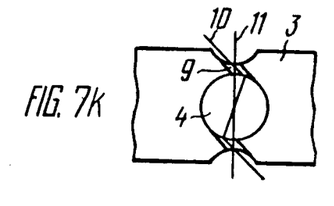
Figure 7L:
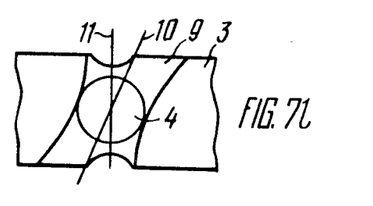

Referring to FIGS. 7a, b, c, d, e, f, k, l, different embodiments of slot outlines are illustrated.

Figure 8A:
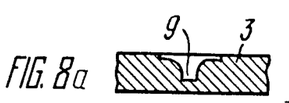
FIGS. 8a, b, c, d, e, f, g, k, l, m, n, p illustrate different embodiments of slot profiles, according to the invention.
Figure 8B:
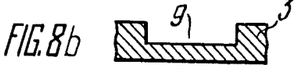
Figure 8C:
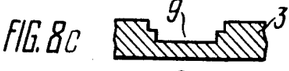
Figure 8D:
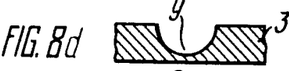
Figure 8E:
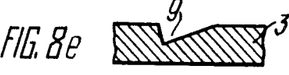
Figure 8F:
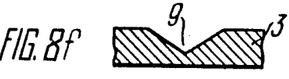
Figure 8K:
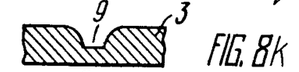
Figure 8L:
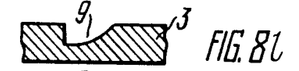
Figure 8M:
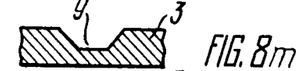
Figure 8N:
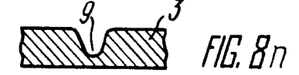
Figure 8P:
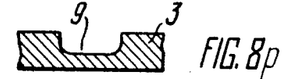
Figure 8Q:
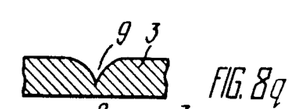

Referring to FIGS. 8a, b, c, d, e, f, g, k, l, m, n, p, different embodiments of slot profiles are illustrated.

Figure 9A:
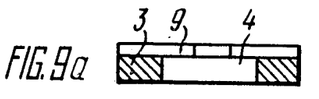
FIGS. 9a, b, c, d, e, f illustrate a plate having a hole, slots and ledges arranged on both sides thereof, according to the invention.
Figure 9B:
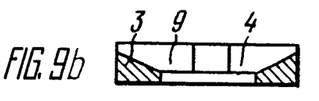
Figure 9C:
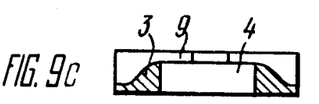
Figure 9D:
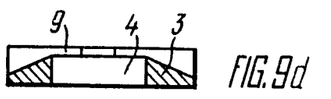
Figure 9E:
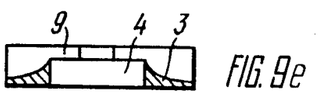
Figure 9F:
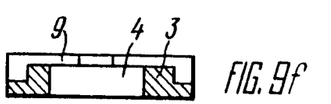

Referring to FIGS. 9a, b, c, d, e, f, a cross-section of the slot is taken along the axis line 10 of FIG. 1 and different embodiments are illustrated.

Slot 18 (FIGS. 5a, b) can have profiles similar to those of the slot 9 of FIG. 8 and the axial cross-section thereof can be the same as that of the slot 9 of FIG. 9.

Figure 10A:
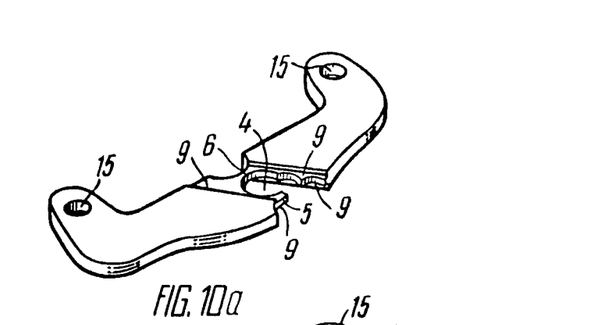
FIG. 10a illustrates a plate having a hole and slots arranged on both sides thereof, according to the invention.
Figure 10B:
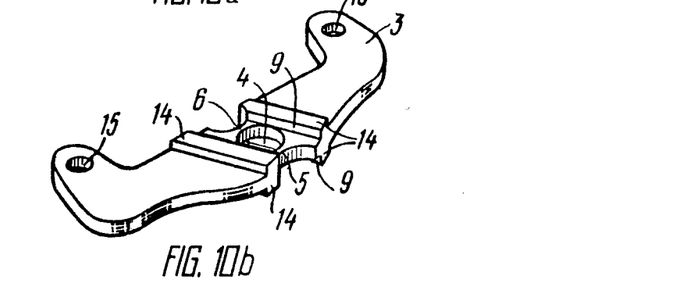
FIG. 10b illustrates a plate having a hole and ledges arranged on both sides thereof, according to the invention.

Slot 9 (FIG. 1) can also be made on the opposite side of the plate 3, the axial line thereof lying in one plane with the axis line 10 of the slot 9 (FIG. 10a). Ledges 14 (FIG. 2), 17 (FIG. 3), the slot 18 (FIGS. 4a, b) can also be made on the opposite side of the plate 3 (FIG. 10b).

A broken section view of the plate 3 (FIG. 10a) is supplied for more graphic presentation of the mutual arrangement of the upper and lower slots 9.

A pair of cover plates 19 (FIG. 11) whose walls 20 face the hole 4 and form the slot 9 are placed on one side of the plate 3.

Magnetic circuit may be equipped with a second plate 3 (FIG. 12) having a hole 4 located so that the cover plates 19 are inserted between the two plates 3.

Figures 12, 13:
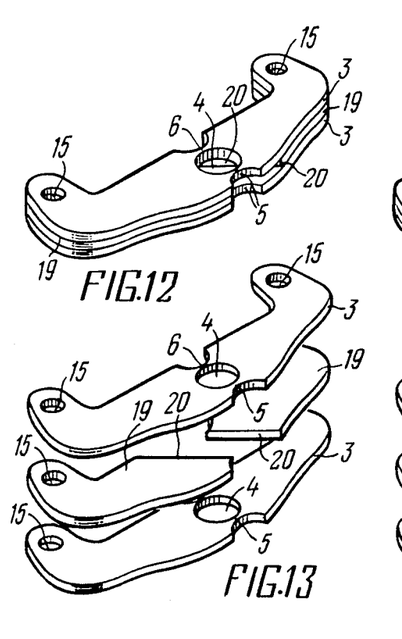
FIG. 12 illustrates two plates and a pair of cover plates placed between said plates and made of a slot magnetic material, according to the invention.
FIG. 13 illustrates two plates having a hole and a pair or cover plates made of a soft magnetic material and placed between said two plates which are spaced along the rotor axis to give a more graphic idea of their mutual arrangement, according to the invention.

FIG. 13 illustrates the relative position of two plates 3 and cover plates 19.

Figure 11:
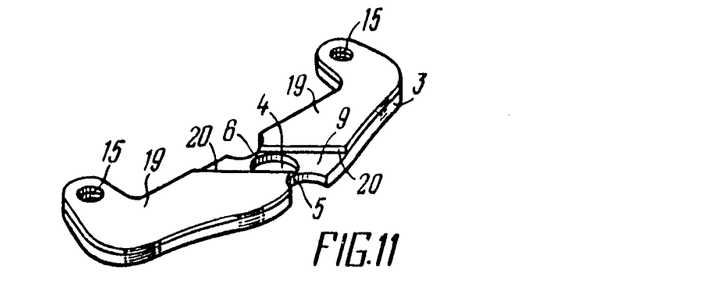
FIG. 11 illustrates a plate having two cover plates arranged on one side thereof, according to the invention.

Another pair of cover plates 19 (FIG. 14) can also be placed on the other side of the plate 3 (FIG. 11). The walls 20 of said cover plates 19 face the hole 4 and form a slot 9 whose axis line lies in one plane with the axis line 10 of the slot 9 on the other side of said plate 3.

Figures 14, 15:
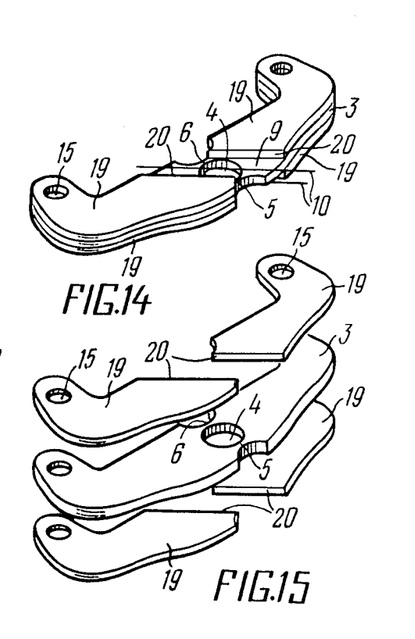
FIG. 14 illustrates a plate having cover plates arranged on two sides thereof, according to the invention.
FIG. 15 illustrates a plate and cover plates made of a soft magnetic material, which are spaced along the axis of the rotor for more graphic presentation of their mutual arrangement, according to the invention.

FIG. 15 illustrates the relative position of the cover plates 19 and the plate 3.

Figures 16, 17:
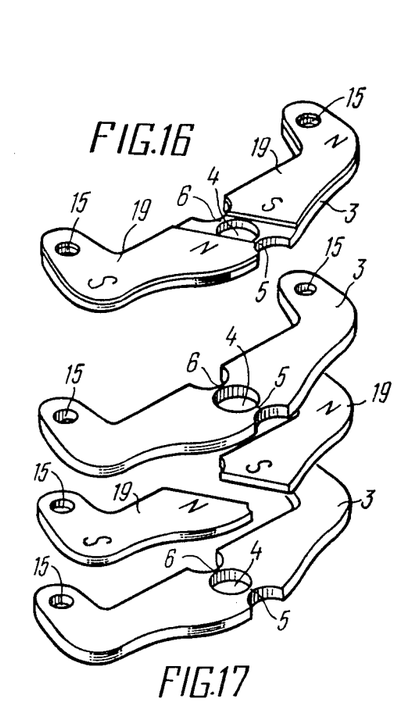
FIG. 16 illustrates a plate with cover plates made of a soft magnetic material and offering a motor step equal to 360°, according to the invention.
FIG. 17 illustrates mutual arrangement of motor components of FIG. 12, when cover plates are made of a hard magnetic material, according to the invention.

For the motor whose step is 180° the cover plates 19 are made of a soft magnetic material, whereas for the motor with a step of 360° the cover plates 19 are made of a hard magnetic material and are magnetized in the direction perpendicular to the line 11 (FIG. 1) connecting the middles of the straps 5 and 6 (FIG. 16).

FIG. 17 illustrates relative position of components of the motor of FIG. 12. The cover plates 19 are made from a hard magnetic material.

Figures 18, 19:
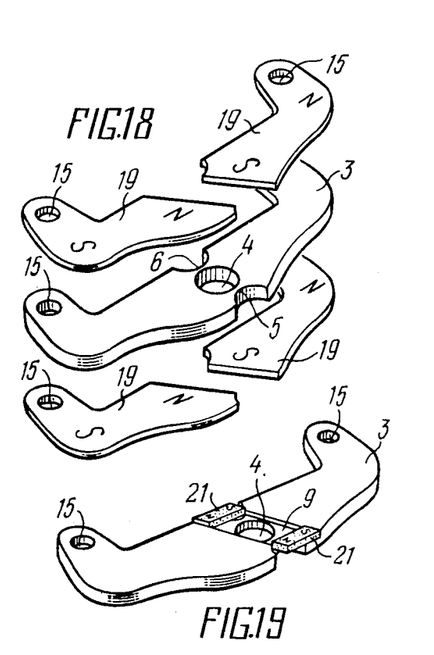
FIG. 18 illustrates mutual arrangement of motor components of FIG. 14, when cover plates are made of a hard magnetic material, as well as the direction of magnetization thereof, according to the invention.
FIG. 19 illustrates a plate with a hole, slot and two permanent magnets placed in the slot, according to the invention.

FIG. 18 illustrates relative position of components of the motor of FIG. 14 wherein the cover plates 19 are made from a hard magnetic material.

To provide a 360° step of the motor, at least one permanent magnet 21 (FIG. 19) having a shape of a prism should be placed in the slot 9. The magnet 21 is magnetized in a direction perpendicular to the line extending through the middles of the straps 5 and 6 which connect the poles.

In order to eliminate the radial attraction of the rotor 7 (FIG. 1) to the stator, two permanent magnets 21 (FIG. 19) are advisable to be used.

Figure 20A:
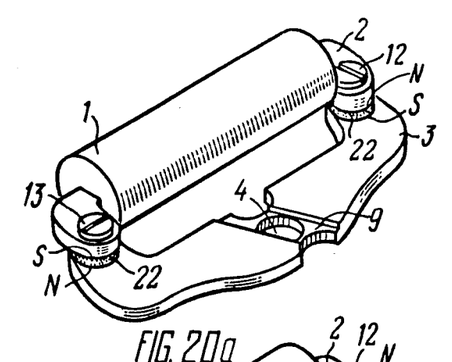
FIGS. 20a, b illustrates a general view of a motor stator featuring permanent magnets placed in the area of connection of the plate and the core, according to the invention.
Figure 20B:
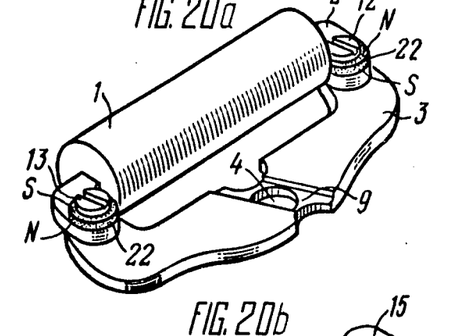

FIG. 20 illustrates embodiments of a stator whose permanent magnets 22 are accommodated at a spot where the plate 3 and the core 2 of the coil 1 are secured together by the screws 12 and 13. The permanent magnets 22 are magnetized in a direction parallel to the axis 8 (FIG. 1) of the rotor 7.

Figure 21:
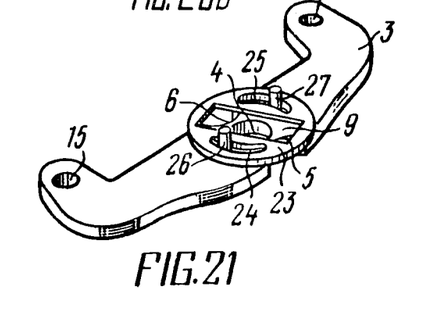
FIG. 21 illustrates a plate having a hole and a cover swivelling plate featuring three slits, one of which forms a slot, according to the invention.

The motor should be equipped with a swivelling cover plate 23 (FIG. 21) having slits to adjust the driving and positioning torques thereof. One central slit forms the slot 9, whereas two other slits 24 and 25 are guideways for the cover plate 23 to swivel about pins 26 and 27 fitted in the plate 3.

The slot 9 of the plate 3 (FIG. 1), whose axis line is arranged at an angle of $0 < \alpha < 90°$ to the line 11 extending through the middles of the straps 5 and 6, is the easiest way to produce magnetic asymmetry of the stator poles, which is conditioned by the geometrical asymmetry of the two parts of the stator pole, arranged on both sides of the magnetic axis of the stator poles.

Figure 22A:
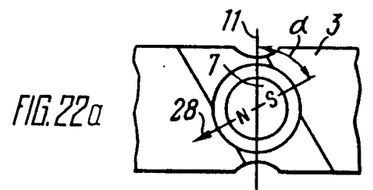
FIGS. 22a, b, c illustrate a diagrammatic representation of a central portion of a plate having a slot and a hole wherein the rotor is placed, according to the invention.

The step motor of FIG. 1 operates as follows:

The motor is operated by alternating polarity pulses. When the coil 1 is deenergized, the rotor 7 is set by the force of the magnetic field of the permanent magnet, into a position where magnetic resistance of the external magnetic circuit of the rotor 7 is minimal or when a magnetic axis 28 (FIG. 22a) of the rotor 7 is at angle $\alpha$ to the line 11 connecting the middles of the straps 5 and 6.

Figure 22B:
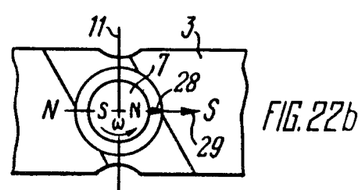

When the coil 1 is excited by a current pulse, the poles of the plate 3 receive the same polarity with relation to the nearest magnet poles and, consequently, torque is produced to turn the rotor 7 in the direction of the nearest position where the magnetic axis 28 (FIG. 22b) of the rotor 7 coincides with the magnetic axis 29 of the stator poles.

Figure 22C:
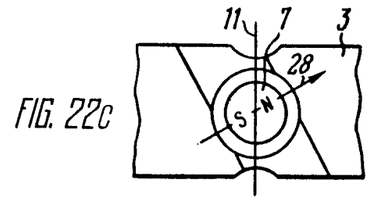

By the action of the torque the rotor 7 turns to an angle equal to $/180°-\alpha/$. When the coil 1 is deenergized, the rotor 7 (FIG. 22c) turns, by the action of the magnetic field of the permanent magnet of said rotor 7, to another angle $\alpha$ to the nearest position where the reluctance of the external magnetic circuit of the rotor 7 is minimal. The step of the motor is therefore 180°.

For the next step to occur the coil 1 (FIG. 1) is again energized by a pulse of the opposite polarity and the process is repeated. As polarity of poles is reversed, the nearest poles of the rotor 7 are again facing like poles of the stator. When the second pulse is removed, the rotor 7 (FIG. 22d) completes the turn. The cycle is then repeated.

Due to magnetic asymmetry of the stator poles introduced by the slot 9 (FIG. 1) dust is no longer accumulated in the area producing magnetic assymetry of the poles and the reliability of the step motor is, consequently, substantially improved.

The efficiency of a single-phase step motor comprising the plate 3 with the hole 4 is defined, primarily, by the relationship of two components of the magnetic flux of the rotor 7: spurious flux closing through the straps 5 and 6 and useful flux closing through the core of the coil 1 and participating in production of the torque of the step motor.

The slot 9 which reduces the cross-section of the straps 5 and 6 also redistributes the useful and spurious magnetic fluxes, bringing the spurious flux down and boosting up the useful flux. With correct selection of the width and depth of the slot 9, and with the slope of the axis line 10 of the slot 9 in the area of the hole 4 being close to $\alpha$, the efficiency of the step motor is still more improved. The torque of the step depends on the fluctuation of the useful flux when the rotor 7 turns from the position where the magnetic resistance of the external magnetic circuit of the rotor 7 is the least to the position where said resistance is the most. Dimensions of the slot 9 depend on the size of the step motor. It is suitable, therefore, to lay down only the maximum width of the slot 9.

The maximum width of the slot 9 is dictated by the boundary of the space around the permanent magnet of the rotor 7, where the strength of the magnetic field is enough to position said rotor 7. The boundary of this area is a circle with a diameter equal to the triple diameter of the magnet of the rotor 7. The maximum width of the slot 9 is, therefore, accepted to be the triple diameter of the rotor 7. With such width of the slot 9, the fluctuation of the useful flux is sufficient to produce a suitable torque.

The minimum width of the slot 9 is dictated by minimum positioning torque of the motor. An insufficiently wide slot 9 makes the rotor 7 lose its definite position when the coil 1 is deenergized and the step motor operation is disrupted. The concrete minimum of the width of the slot 9 is dictated by the size and properties of the magnet of the rotor 7, and by the overall dimensions of the motor.

The maximum depth of the slot 9 is dependent upon the strength of the straps 5 and 6.

The serviceability of the proposed step motor is achieved by a simple means-slot 9 in the plate 3, which improves reliability and efficiency of the step motor.

A motor featuring a narrow slot 9 which does not envelop the straps 5 and 6 is inferior to a motor having a wide slot in terms of efficiency. The use of such a motor is feasible due to simplier production technology. Slot 18 (FIG. 5b) reduces the cross-section of the straps 5 and 6 and, consequently, increases the efficiency of the step motor as the spurious flux through the straps 5 and 6 is cut down.

An embodiment of the plate 3 having a hole 4 and a slot 9 made as a whole can be recommended for thin plates not exceeding 1 mm. Thicker plates 3 are difficult to stamp because of the area of the straps 5 and 6.

When the plate 3 is not thicker than, say, 1 mm, the step motor to be produced has magnetic asymmetry of the stator poles produced by means of cover plates 19 (FIG. 11) arranged upon the stator plate 3 or inserted between two stator plates 3 (FIG. 12). The step motor is technologically easier to manufacture in this case since all parts of the stator are simply stamped out of thin sheets of a soft magnetic material, the stator plate 3 and the cover plates 19 are stamped by one press tool. The cover plates 19 are made from the same plate 3, the central portion being cut out therefrom.

The swivelling cover plate 23 (FIG. 21) used in the step motor permits adjustment of the operating torque of the motor, both in magnitude and in direction. Moreover, the central slit in the cover plate defining the slot 9 having parallel walls is a simple means to produce magnetic asymmetry of the stator poles.

Such a step motor possesses more potential applications and provides a universal motor design to be used in automatic instruments.

Step motors whose plate 3 is made as in FIGS. 2, 3, 4, 5, 10, 11, 12, 13, 14, 15 and 21 operate as has been described for the motor of FIG. 1. Selection of a concrete embodiment of the plate 3 is dictated by the application of a single-phase step motor, its function and its production technology.

The step motor having permanent magnets 21 (FIG. 19) positioned in the slot 9 permits a 360° step, which makes the position of the rotor 7 unique when the coil 1

(FIG. 1) is deenergized. The proposed shape and position of the magnet 21 (FIG. 19) substantially reduce the radial pull between the magnet of the rotor 7 and the magnet 21 caused by the difference in magnetization of the magnets 21. Magnetic asymmetry in this case is produced by the walls of the slot 9, which acquire definite polarity due to magnets 21.

The step motor operates by unipolar pulses in the following manner.

Figure 23A:
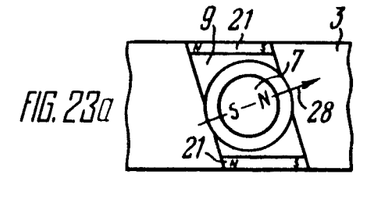
FIGS. 23a, b illustrate a diagrammatic representation of a central portion of a plate having a slot wherein permanent magnets are placed, and a hole wherein the rotor is located, according to the invention.

When the coil 1 (FIG. 1) is deenergized, the rotor 7 (FIG. 23a) assumes a position where the poles of the magnet of the rotor 7 turn in accordance with the magnetization of the walls of the slot 9. Position of the rotor 7 is, thus, dictated, when the coil 1 (FIG. 1) is deenergized, by the direction of magnetization of the magnets 21 (FIG. 23a).

Figure 23B:
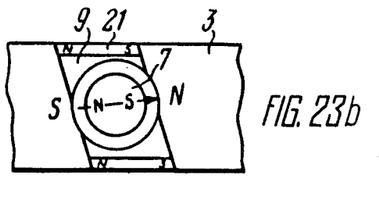

By the action of the current pulse which imparts polarity opposite to the polarity of the walls of the slot 9 to the poles of the plate 3 (FIG. 23b) a torque is produced and, with sufficient power of the pulse, the rotor 7 is turned to an angle in excess of 180°. When the coil 1 is deenergized, interaction of the magnetic fields of the magnet of the rotor 7 and the magnets 21 makes the rotor 7 move onwards in the same direction until the initial position is assumed (FIG. 23a). In this manner the step of the motor is 360° and the initial position of the rotor 7 is unambiguous.

The step motors of FIGS. 16, 17, 18 and 20 is similar to the above description (FIG. 19).

Magnets 21 are much simpler to set and fix when said magnets 21 (FIGS. 20a and b) are accomodated in the place where the core 2 of the winding 1 and the plate 3 are secured together, and when said magnets 21 are made as cover plates 19 (FIGS. 16, 17 and 18).

The present invention makes the step motor more reliable, improves its efficiency and expands potential applications.

What is claimed is:

1. A single-phase step motor, comprising:
a stator having a magnetic circuit provided by a coil, a core within said coil, and a stator plate magnetically coupled to said core, said plate having a hole therein, with poles and straps between said poles, formed by said hole of said plate, said straps extending between said poles on opposite sides of said hole;
a rotor positioned in said hole of said plate and having an axis of rotation;
said plate having a first surface and a second surface parallel thereto, said surfaces being perpendicular to said axis of said rotor;
a slot provided on at least one of said surfaces of said plate, said slot extending through said straps and said hole;
said rotor having a radially magnetized permanent magnet;
the width of said slot being not more than three times the diameter of said rotor;
a swivel plate arranged on said stator plate and having a first central slit, a second slit on one side of said central slit, and a third slit on the other side of said central slit;
said first central slit being arranged above said hole of said stator plate and covering at least a part of said hole;
said second slit and said third slit comprising guides for permitting movement of said swivel plate clockwise and counterclockwise in order to adjust the magnitude and direction of the torque of the single-phase step motor; and
pins secured on said stator plate and extending into said second slit and said third slit of said swivel plate.

* * * * *

UNITED STATES PATENT AND TRADEMARK OFFICE
CERTIFICATE OF CORRECTION

PATENT NO. : 4,491,751

DATED : January 1, 1985

INVENTOR(S) : Kuznetsova, et al

It is certified that error appears in the above-identified patent and that said Letters Patent is hereby corrected as shown below:

On the cover page of the patent, Item [73], change the Assignee to read as follows:

Moskovsky Energetechesky Institut U.S.S.R.,
Moscow

Pervy Moskovsky Chasovoi Zavod Imeni S.M. Kirova U.S.S.R.,
Moscow

Vtoroi Moskovsky Chasovoi Zavod U.S.S.R.,
Moscow

Signed and Sealed this

Sixteenth Day of July 1985

[SEAL]

Attest:

DONALD J. QUIGG

Attesting Officer   Acting Commissioner of Patents and Trademarks